United States Patent Office 3,470,207
Patented Sept. 30, 1969

---

3,470,207
IMINO-1,3-DITHIETANES AND THEIR PREPARATION
Roger Williams Addor, Pennington, N.J., assignor to American Cyanamid Company, Stamford, Conn., a corporation of Maine
No Drawing. Filed Apr. 21, 1967, Ser. No. 632,545
Int. Cl. C07d 69/00; C07f 9/28, 9/16
U.S. Cl. 260—327
9 Claims

ABSTRACT OF THE DISCLOSURE

The present invention relates to novel imino-1,3-dithietanes and to methods for preparing the same. More particularly, the invention relates to 2-phosphinylimino-1,3-dithiethanes or 2-phosphinothioylimino - 1,3 - dithietanes, to methods for their manufacture, and to compositions and methods for controlling a variety of pests employing the aforementioned 2-imino-1,3-dithietanes. Still more particularly, the invention is concerned with 2-imino-1,3-dithietanes represented by the structure:

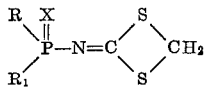

wherein X is sulfur or oxygen, and R and $R_1$ each represent a radical, such as a lower alkyl, lower alkoxy or phenyl, prepared by reacting an alkali metal hydrosulfide and an isothiocyanate of the structure:

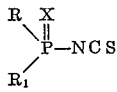

wherein R, $R_1$ and X are the same as defined above, ring closing the so-formed dithiocarbamate salt with methylene halide or methylene sulfate in the presence of a suitable base, and then recovering a 2-imino-1,3-dithietane derivative defined hereinabove.

---

Illustrative compounds which fall within the purview of the present invention are:

2-dimethoxyphosphinothioylimino-1,3-dithietane,
2-dimethoxyphosphinylimino-1,3-dithietane,
2-diethoxyphosphinylimino-1,3-dithietane,
2-diethoxyphosphinothioylimino-1,3-dithietane,
2-diisopropoxyphosphinylimino-1,3-dithietane,
2-diethylphosphinothioylimino-1,3-dithietane,
2-diethylphosphinylimino-1,3-dithietane,
2-methoxyphenylphosphinylimino-1,3-dithietane,
2-ethoxyphenylphosphinothioylimino-1,3-dithietane,
2-methylmethoxyphosphinylimino-1,3-dithietane, and
2-ethylmethoxyphosphinothioylimino-1,3-dithietane.

In general, the compounds of the present invention can be prepared in a straightforward manner by reacting one mole of a salt of a phosphinyl- or phosphinothioyldithiocarbamate possessing the formula:

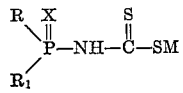

wherein X is oxygen or sulfur, M represents an alkali metal, as for example, sodium, potassium or lithium, and R and $R_1$ are each the same as hereinabove defined, with one mole or, preferably, 1.1–1.5 moles, or higher, of either methylene sulfate or methylene halide, such as methylene chloride, bromochloromethane, methylene bromide or methylene iodide, in the presence of an equimolar amount of a suitable base, such as sodium bicarbonate, potassium hydroxide or triethylamine. Ring-closure occurs with formation of a 2-phosphinyl- or 2-phosphinothioylimino-1,3-dithietane. This result is unexpected, since the reaction of other dithiocarbamate salts, for instance, dialkyldithiocarbamate salts with a methylene halide, is reported to yield alkylene bis-dithiocarbamates.

In general, the overall reaction may be carried out over a wide range of temperatures, as for instance, from about 0° C. to about 100° C. It is preferred to carry the reaction out in the presence of an inert organic solvent, dimethylformamide or methanol being particularly suitable, although others, such as benzene or 1,2-dimethoxyethane, may be used.

Alternatively, the process of the invention can be carried out directly from a phosphinyl- or phosphinothioyl isothiocyanate of the formula:

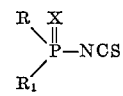

wherein R, $R_1$ and X are defined above, by reacting the latter with an alkali hydrosulfide so as to prepare an intermediate dithiocarbamate salt which without isolation of the resultant intermediate is reacted with a ring-closing compound, such as methylene bromide, methylene chloride or methylene sulfate in the presence of a base, such as sodium bicarbonate, potassium hydroxide or triethylamine.

The dithiocarbamate salts employed as intermediates in the reaction are prepared in the manner set forth in a copending application, Ser. No. 619,606, filed on Mar. 1, 1967. Briefly, however, the salts are prepared by reacting a suitable alkali metal hydrosulfide in the presence of an inert solvent, such as methanol, with a phosphinyl- or phosphinothioyl isothiocyanate in accordance with the reaction graphically written as follows:

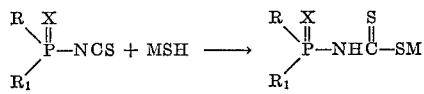

wherein R, $R_1$, M and X are each defined as hereinabove. Resultant product can be isolated either as a precipitated solid or, if in solution, by the removal of solvent. For many purposes, it is not necessary, nor even desirable, to isolate the product from the medium in which it is made. For instance, where the reaction medium is inert with respect to further processing operations, isolation of the product is not required.

Exemplary isothiocyanates employed as reactants in the process of the invention are:

Dimethoxyphosphinyl isothiocyanate,
Dimethoxyphosphinothioyl isocyanate,
Diethoxyphosphinothioyl isothiocyanate,
Dipropoxyphosphinyl isothiocyanate,
Dibutoxyphosphinothioyl isothiocyanate,
Diethylphosphinyl isothiocyanate,
Diphenylphosphinothioyl isothiocyanate, and
Ethoxyphenylphosphinothioyl isothiocyanate.

In general, the isothiocyanate reactant herein may, for example, be prepared by the reaction of a phosphinyl- or phosphinothioyl halide with ammonium thiocyanate as disclosed in "Methoden der Organischen Chemie," vol. 12/2, pages 587–588 and 795–796, inclusive.

Illustrative hydrosulfides which can be used in the process of the invention are: potassium hydrosulfide, sodium hydrosulfide, and lithium hydrosulfide. The appropriate hydrosulfide can be generated from the corresponding hydroxide or alkoxide in situ by saturating the metal hydroxide or alkoxide solution with hydrogen sulfide. Where the hydrosulfide is to be generated in situ, solvents such as methanol, ethanol, t-butanol or dimethylformamide are preferably utilized. However, suspensions of metal hydrosulfides in solvents, such as ethylene glycol dimethylether, benzene or chloroform may also be employed.

The 2-phosphinylimino- or 2-phosphinothioylimino-1,3-dithietanes of the present invention are highly effective as pesticides with a broad spectrum of activity against insects nematodes, and arachnids. Further, they are both effective systemically and on contact and can be applied to plant foilage, soil or water in either solid or liquid form so as to protect the applied area from insect attack. Still further, they are useful in the control of insect population.

As solid preparations, the compounds of the invention can be admixed with inert carriers, such as finely divided clay, talc, silica, ground corn cobs and equivalents of the same. Alternatively, they may be applied to granular materials, such as sand, or celite particles. In addition, the compounds of the invention can be prepared as wettable powders which are ultimately dispersed in water and sprayed on foilage or soil. In the event a liquid spray is desired, such may be prepared by either dissolving or dispersing the 1,3-dithietane in a diluent or solvent, such as benzene, xylene, lower alcohols or higher aromatic solvents either with or without an emulsifying agent, such as Toximul R and Toximul S, and, thereafter, further diluting the mixture with a diluent, such as deodorized kerosene or water.

The quantity or amount of inert solid or liquid carrier with respect to the pesticidal compounds of the present invention is not critical. However, it has been found that up to about 10% by weight of the compound based on the weight of the inert carrier is generally sufficient to carry out the intent of the present invention. In most instances, it has been observed that from about 1% to about 10% of the active ingredient can be employed effectively and safely.

To facilitate a further understanding of the present invention, the following illustrative examples are presented. These are not to be taken as limitative of the invention. Unless otherwise stated, the parts are by weight and the analyses are in percent.

EXAMPLE 1

Preparation of 2-dimethoxyphosphinothioylimino-1,3-dithietane

In a suitable reaction vessel equipped with stirrer, an ice-cooled mixture of 1.09 parts of sodium hydroxide in 25 parts (by volume) of methanol is saturated with hydrogen sulfide. The addition of 5 parts of dimethoxyphosphinothioyl isothiocyanate yields a yellow solution to which solution are added 2.5 parts of sodium bicarbonate and 6.0 parts (by volume) of methylene bromide. The mixture is stirred for about 24 hours at room temperature and then is concentrated in vacuo. Resultant residue is taken up in benzene. The benzene mixture is washed with dilute hydrochloric acid, dilute sodium hydroxide and water, and then dried and concentrated on a thin-film evaporator. The evaporator is operated at 100° C. under a reduced pressure equivalent to 0.3 mm. Hg to yield 2.6 parts of a yellow oily product analyzing as follows:

Analysis.—Calcd. for $C_4H_8NO_2PS_3$: C, 20.96; H, 3.52; N, 6.11; P, 13.51; S, 41.96. Found: C, 21.25; H, 3.92; N, 6.33; P, 13.48; S, 42.13; C, 21.10; H, 3.70.

EXAMPLE 2

Preparation of 2-dimethoxyphosphinylimino-1,3-dithietane

The procedure of Example 1 is repeated in every detail except that dimethoxyphosphinyl isothiocyanate is substituted for the isothiocyanate reactant therein and washing is with a saturated sodium chloride solution only. A good yield of 2-dimethoxyphosphinylimino-1,3-dithietane is obtained as a solid having a melting point equal to between 57.4° C. and 58.8° C., after recrystallization from an ether/petroleum ether solvent mixture. The solid 1,3-dithietane as prepared above has the following analysis:

Analysis.—Calcd. for $C_4H_8NO_3PS_2$: C, 22.53; H, 3.78; N, 6.57; P, 14.53; S, 30.08. Found: C, 22.68; H, 3.90; N, 6.72; P, 14.47; S, 30.14.

EXAMPLE 3

Preparation of 2-diethoxyphosphinylimino-1,3-dithietane

To a mixture of 13 parts (by volume) of methylene bromide and 1.6 parts of sodium bicarbonate in 50 parts (by volume) of methanol are added rapidly 5.0 parts of potassium diethoxyphosphinyldithiocarbamate portionwise. After standing for about 20 hours, benzene is added to the resultant colorless mixture. Precipitated salts are next filtered off and the residue and the filtrate are concentrated in vacuo. The residue is again taken up in benzene/ether. The mixture is filtered, and concentration of the filtrate affords 4.6 parts of slightly yellow oil. The oil, in benzene/ether, is washed three times with 1:1 water-saturated sodium chloride solution. The yield of recovered pale yellow oil, $n_D^{25}=1.5348$, amounts to 4.0 grams (89%).

Analysis.—Calcd. for $C_6H_{12}NO_3PS_2$: C, 29.87; H, 5.01; N, 5.81; P, 12.84; S, 26.58; M.W. 241. Found: C, 29.97; H, 5.12; N, 5.97; P, 12.52; S, 26.27; M.W. 250.

The infrared spectrum shows strong maxima at 1240 and 1600 cm.$^{-1}$ assignable to the P=O and C=N functions, respectively. The nuclear magnetic resonance spectrum shows a multiplet centering ca. 5.9$\tau$ (—O—CH$_2$—) plus a sharp singlet at 6.07$\tau$ (—S—CH$_2$—S) (6H total) and a triplet at 8.6$\tau$ (—CH$_3$, 6H).

EXAMPLE 4

The procedure of Example 3 is followed in every respect except that a mole ratio of potassium diethoxyphosphinyldithiocarbamate to methylene bromide is 1:1.5, respectively, and further, that dimethylformamide is employed as a solvent. Resultant reaction is found to be complete within one hour and after work up of the reaction mixture a 75% yield of 2-diethoxyphosphinylimino-1,3-dithietane, is obtained.

EXAMPLE 5

Preparation of 2-diethoxyphosphinothioylimino-1,3-dithietane

To an ice-cooled solution of 1.90 parts of sodium hydroxide in 50 parts (by volume) of methanol which has been saturated with hydrogen sulfide is added 10.0 parts of diethoxythiophosphoryl isothiocyanate over about ten minutes. After about twenty minutes, 4.40 parts of sodium bicarbonate are introduced into the ice-cooled mixture, followed by 10 parts (by volume) of methylene bromide and the mixture is stirred overnight. The mixture is then diluted with benzene, filtered, concentrated, remixed with ether/benzene, and washed with water, alkali, and acid. After drying, the mixture is concentrated in vacuo to yield 10.6 parts of clear yellow oil which becomes an oily crystalline solid on standing. Recrystallization from 50 ml. 1:1 ether/petroleum ether at 0° yields 5.8 parts of colorless crystals whose melting point is 41.8° C.–42.8° C. Recrystallization of the residue from the mother liquor on a smaller scale yields a second crop of white crystals, melting point 38°–42° (total 7.2 grams, 58%).

Analysis.—Calcd. for $C_6H_{12}NO_2PS_3$: C, 28.00; H, 4.70; N, 5.44; P, 12.04; S, 37.38. Found: C, 27.98; H, 4.80; N, 5.72; P, 12.03; S, 37.10.

The infrared spectrum shows C=N absorption at 1600 cm.$^{-1}$. The nuclear magnetic resonance spectrum shows a multiplet centering at ca. 5.7$\tau$ (—O—CH$_2$—) plus a sharp singlet at 5.83$\tau$ (—S—CH$_2$—S—) (6H total) and a triplet at 8.6$\tau$ (—CH$_3$, 6H).

EXAMPLE 6

Preparation of 2-diisopropoxyphosphinylimino-1,3-dithietane

A mixture of 54.4 parts of potassium diisopropoxyphosphoryldithiocarbamate, 25.8 parts (by volume) of methylene bromide, and 17.0 parts of sodium bicarbonate in 250 ml. of methanol are stirred about 24 hours. After adding ca. 50 parts (by volume) of benzene, the mixture is filtered and concentrated in vacuo. The residue is then taken up in benzene and washed with dilute sodium hydroxide, dilute hydrochloric acid, and water, dried, and reconcentrated to yield 36.2 parts (73%) of 2-diisopropoxyphosphinylimino-1,3-dithietane as a clear light yellow oil, whose index of refraction ($n_D^{25}$) is 1.5163.

Analysis.—Calcd. for $C_8H_{16}NO_3PS_2$: C, 35.67; H, 5.99; N, 5.20; P, 11.50; S, 23.81. Found: C, 35.90; H, 6.16; N, 5.45; P, 11.50; S, 23.66.

The infrared spectrum shows maxima at 1240 cm.$^{-1}$ and 1610 cm.$^{-1}$ assignable to the P=O and C=N groups, respectively. The nuclear magnetic spectrum shows a multiplet at 5.1–5.7τ (>CO—O—, 2H), a singlet at 6.12τ

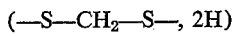
(—S—CH$_2$—S—, 2H)

and a doublet at 8.60 and 8.70τ (CH$_3$—, 12H).

EXAMPLE 7

Preparation of 2-dimethylphosphinothioylimino-1,3-dithietane

A mixture of 1 mole of sodium hydroxide in methanol is saturated with hydrogen sulfide and the resultant mixture is reacted with 1 mole of dimethylphosphinothioyl isothiocyanate while stirring. After addition is complete, the stirred mixture is treated with about 1 mole of sodium bicarbonate and 3 moles of methylene bromide. Resultant mixture is stirred for 24 hours at room temperature and then concentrated under reduced pressure. The residue is treated with a benzene/water mixture and the organic phase is separated from the aqueous phase and the latter concentrated under vacuum. The above-identified compound is recovered in good yield.

EXAMPLE 8

Preparation of 2-diethylphosphinylimino-1,3-dithietane

Repeating the above procedure but substituting diethylphosphinyl isothiocyanate for dimethylphosphinothioyl isothiocyanate yields 2 - diethylphosphinylimino - 1,3-dithietane.

EXAMPLE 9

Preparation of 2-methoxyphenylphisphinylimino-1,3-dithietane

A stirred mixture of sodium hydrosulfide in methanol is treated with methoxyphenylphosphinyl isothiocyanate. When addition of the isothiocyanate is complete, sodium bicarbonate is added followed by addition of methylene bromide. The mixture is cooled to room temperature and concentrated under reduced pressure. The remaining residue is treated with a benzene/water mixture and worked up as in Example 6 yielding the above-identified compound.

EXAMPLE 10

Preparation of 2-ethoxyphenylphosphinothioylimino-1,3-dithietane

Ethoxyphenylphosphinothioyl isothiocyanate is substituted for methoxyphenylphosphinyl isothiocyanate in the process of Example 9. There is then recovered 2-ethoxyphenylphosphinothioylimino-1,3-dithietane in good yield and purity.

Example 11

Preparation of 2-methylmethoxyphosphinylimino-1,3-dithietane

To a stirred mixture of one mole of potassium hydrosulfide in dimethylformamide is added one mole of methylmethoxyphisphinyl isothiocyanate. When addition is complete, one mole of potassium hydroxide is slowly added to the mixture, followed by addition of one mole of methylene iodide while stirring. The reaction is exothermic. Stirring is continued until the mixture comes to room temperature. The mixture is then concentrated under vacuum, treated with a benzene/salt-water mixture, the organic layer recovered, and dried. The above-named compound is recovered in good yield.

EXAMPLE 12

Preparation of 2-ethylmethoxyphosphinothioylimino-1,3-dithietane

The procedure of Example 11 is repeated in every detail except that ethylmethoxyphosphinothioyl isothiocyanate is substituted for methylmethoxyphosphinyl isothiocyanate and there is obtained a good yield of 2-ethylmethoxyphosphinothioylimino-1,3-dithietane.

The following example illustrates the pesticidal activity of representative compounds as exemplified above.

EXAMPLE 13

Representative compounds of the instant invention are employed in the following tests:

Southern armyworm (*Prodenia eridania* Cram.)

Representative compounds to be tested are made up as 0.1%, 0.01%, and 0.001% solutions in 65% acetone/35% water mixtures. Sieva lima bean leaves are dipped in the test solutions and set in the hood to dry. When dry, they are placed in four-inch petri dishes which have a moist filter paper in the bottom, and ten third-instar armyworm larvae about ⅜″ long are added to each dish. The dishes are covered and held at 80° F., 60% R.H. After two days, mortality counts and estimates of the amount of feeding are made.

Bean aphid (*Aphis fabae* Scopoli)

Representative compounds are tested as 0.1%, 0.01%, and 0.001% solutions or suspensions in 65% acetone/35% water. Two-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F. and 50% R.H.

Two-spotted spider mite (*Tetranychus urticae* Koch)

Sieva lima bean plants with primary leaves three to four inches long are infested with about 100 adult mites per leaf four hours before use in this test. The mite and egg infested plants are dipped for three seconds in the 0.01% and 0.001% solutions used in the armyworm tests, and the plants set in the hood to dry. They are held for two days at 80° F., 60% R.H., and the adult mite mortality estimated on one leaf under a stereoscopic microscope. The other leaf is left on the plant an additional five days and then examined at 10× power to estimate the kill of eggs and of newly-hatched nymphs, giving a measure of ovicidal and residual action, respectively.

Confused flour beetle (*Tribolium confusum* Jacquelin du Val)

Compounds are formulated as 1% dusts by mixing 0.1 gram of the compound with 9.9 grams of talc, wetting with 5 ml. of acetone and grinding with a mortar and pestle until dry. 125 mg. of this 1% dust is then blown into the top of a dust settling tower with a short blast of air. The dust is allowed to settle on four-inch petri dishes for two minutes, giving a deposit of approximately 87 mg./sq. foot of the 1% dust. The dishes are removed and 25 adult confused flour beetles are added immediately. The dishes are held for three days at 80° F., 60% R.H., following which mortality counts are made.

Large milkweed bug (*Oncopeltus fasciatus* Dallas)

The 1% dusts described above are used in this test. 25 mg. of the 1% dust is sprinkled evenly over the glass bottom of a seven-inch diameter cage giving a deposit of approximately 94 mg./sq. foot of the 1% dust. Water is supplied in a two-ounce bottle with a cotton wick, twenty adult bugs are added and a screen cover placed on the top. Mortality counts are made after holding for three days at 80° F. and 60% R.H.

German cockroach (*Blattella germanica* Linnaeus)

The procedure is the same as for the large milkweed bug test, except that in this test only adult males are used.

Systemic tests

The compounds to be tested are formulated as emulsions containing 0.1 gram of test material, 0.2 gram of Alrodyne 315 emulsifier, acetone and water. This is diluted with sufficient water to give 100 p.p.m. and 10 p.p.m. emulsions. Sieva lima bean plants with only the primary leaves unfolded are cut off just above soil level and inserted into two-ounce bottles of test emulsions and held in place by a bit of cotton wrapped around the stem. The bottles are then placed in a ventilated box with the leaves extending outside the box, such that any possible fumes from the compounds will be drawn out the end of the box rather than rising to affect the test leaves. About 50 adult two-spotted spider mites are placed on each leaf. After holding three days at 80° F. and 60% R.H., mortality estimates are made and one leaf from each plant is placed on a moist filter paper in the bottom of a petri dish. Ten third-instar southern armyworm larvae are added to each dish and mortality counts are made after holding another three days at 80° F. and 60% R.H.

Common Malaria Mosquito (*Anopheles quadrimaculatus* Say) Larvicide test

Groups of 25 larvae of the common malaria mosquito are transferred with a medicine dropper to a 50 ml. beaker containing 25 ml. of water. The test compound is formulated as an emulsion containing test material, an emulsifier, acetone and water. This emulsion is diluted with sufficient 65% acetone/35% water mixture to give 0.4 or 0.1 p.p.m.

TABLE I

| Compound | Southern Armyworm | | | Bean Aphid | | | Two-Spotted Spider Mite | | TC[1] 1% | MB[1] 1% | GC[1] 1% |
|---|---|---|---|---|---|---|---|---|---|---|---|
| | 0.1% | 0.01% | 0.001% | 0.1% | 0.01% | 0.001% | 0.1% | 0.001% | | | |
| $(CH_3O)_2\overset{O}{\overset{\|}{P}}-N=\langle{}_S^S\rangle$ | 100 | 100 | 60 | 100 | 100 | 100 | 100 | 100 | 100 | 100 | 100 |
| $(CH_3O)_2\overset{S}{\overset{\|}{P}}-N=\langle{}_S^S\rangle$ | 100 | 80 | 0 | 100 | 100 | 100 | 100 | 82 | 100 | 100 | 90 |
| $(C_2H_5O)_2\overset{O}{\overset{\|}{P}}-N=\langle{}_S^S\rangle$ | 100 | 100 | 100 | 100 | 100 | 100 | 100 | 100 | 100 | 100 | 100 |
| $(C_2H_5O)_2\overset{S}{\overset{\|}{P}}-N=\langle{}_S^S\rangle$ | 100 | 100 | 10 | 100 | 100 | 99 | 100 | 100 | 100 | 95 | 100 |
| $[(CH_3)_2CHO]_2\overset{O}{\overset{\|}{P}}-N=\langle{}_S^S\rangle$ | 100 | 0 | ---- | 100 | 100 | 15 | 100 | 95 | 100 | 100 | 100 |

[1] *Tribolium confusum* (TC), Milkweed Bug (MB), German Cockroach (GC).

| Compound | Systemics (p.p.m.) | | | | Mosquito (p.p.m.) | | | | Housefly, (p.p.m.) | | Corn Rootworm, lb./A | |
|---|---|---|---|---|---|---|---|---|---|---|---|---|
| | Mites | | Armyworm | | Larvae | | Adults | | | | | |
| | 100 | 10 | 100 | 10 | 0.4 | 0.1 | 10 | 1 | 50 | 5 | 50 | 10 |
| $(CH_3O)_2\overset{O}{\overset{\|}{P}}-N=\langle{}_S^S\rangle$ | 100 | 100 | 100 | 100 | 40 | 0 | 100 | 40 | 100 | 100 | 100 | 100 |
| $(CH_3O)_2\overset{S}{\overset{\|}{P}}-N=\langle{}_S^S\rangle$ | 100 | 100 | 40 | 0 | 100 | 12 | ---- | 90 | ---- | 100 | 100 | 80 |
| $(C_2H_5O)_2\overset{O}{\overset{\|}{P}}-N=\langle{}_S^S\rangle$ | 100 | 90 | 100 | 100 | 92 | 0 | 100 | 90 | 100 | 100 | 100 | 100 |
| $(C_2H_5O)_2\overset{S}{\overset{\|}{P}}-N=\langle{}_S^S\rangle$ | 100 | 100 | 100 | 100 | 100 | 72 | 100 | 100 | 100 | 100 | ---- | ---- |
| $[(CH_3)_2CHO]_2\overset{O}{\overset{\|}{P}}-N=\langle{}_S^S\rangle$ | 100 | 85 | 100 | 0 | 20 | 0 | 100 | 0 | 100 | 80 | 100 | 100 | of active ingredient in solution when the emulsion and water containing the larvae are admixed. Mortality counts are made after 24 hours at 80° F.

Adulticide test

Test compounds are prepared as 10 p.p.m. and 1 p.p.m. solutions in acetone. Glass microscope slides are dipped in the test solutions and allowed to dry. When dry, they are individually placed in four-ounce wide mouth bottles and ten 4- to 5-day old mosquitoes of mixed sexes are added to each bottle. A piece of cotton gauze serves as a lid, and a wad of cotton soaked in 10% sugar solution serves as food. Mortality counts are made after 24 hours of continuous exposure to the residue on the glass slide; temperature is 80° F. and 60% R.H.

Housefly (*Musca domestica* Linnaeus)

Groups of 25 adult female houseflies are lightly anesthetized with carbon dioxide, placed in wide-mouth pint mason jars, and covered with a screen cap. The test compound is formulated as an emulsion containing 50 p.p.m. or 5 p.p.m. of test material, an emulsifier, acetone and water. The mouth of the vial is covered with a single layer of cheesecloth, inverted and placed on the screen cap so that the flies can feed on the solution through the screen. Mortality counts are made after two days at 80° F.

Southern corn rootworm (*Diabrotica undecimpunctata howardi* Barber)

The compound is formulated as a dust and incorporated into the soil at the equivalent of 50 pounds per acre. The soil is sub-sampled into bottles and ten 6- to 8-day old rootworm larvae added to each bottle, which is then capped. Mortality counts are made after six days at 80° F., 60% R.H.

The results of the above tests are reported in Table I.

I claim:
1. A compound of the formula:

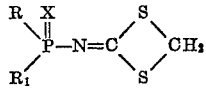

wherein X is sulfur or oxygen, and R and $R_1$ are each radicals selected from the group consisting of lower alkyl, lower alkoxy and phenyl.

2. The compound according to claim 1: 2-dimethoxyphosphinylimino-1,3-dithietane.

3. The compound according to claim 1: 2-dimethoxyphosphinothioylimino-1,3-dithietane.

4. The compound according to claim 1: 2-diethoxyphosphinylimino-1,3-dithietane.

5. The compound according to claim 1: 2-diethoxyphosphinothioylimino-1,3-dithietane.

6. The compound according to claim 1: 2-dimethylphosphinothioylimino-1,3-dithietane.

7. The compound according to claim 1: 2-diethylphosphinylimino-1,3-dithietane.

8. The compound according to claim 1: 2-ethoxyphenylphosphinothioylimino-1,3-dithietane.

9. A method for the preparation of a 1,3-dithietane compound of the formula:

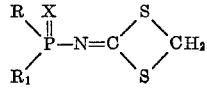

wherein X is sulfur or oxygen and R and $R_1$ each represent radicals selected from the group consisting of lower alkyl, lower alkoxy and phenyl, comprising the steps of: reacting at least equimolar amounts of (a) an isothiocyanate of the formula:

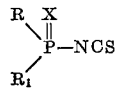

wherein X, R and $R_1$ are as described above, with (b) an alkali metal hydrosulfide, ring-closing the so-prepared mixture by introducing therein a compound selected from the group consisting of a methylene halide and methylene sulfate in the presence of a base, and recovering the thus-formed 1,3-dithietane compound from the reaction mixture.

References Cited

UNITED STATES PATENTS 3,197,481   7/1965   Addor _____ 260—327

JAMES A. PATTEN, Primary Examiner

U.S. Cl. X.R.

260—947, 959; 424—202